Feb. 5, 1952 W. C. BAUMAN 2,584,181
ANTIGLARE HOUSING FOR HEAD LAMPS
Filed Aug. 6, 1949 2 SHEETS—SHEET 1
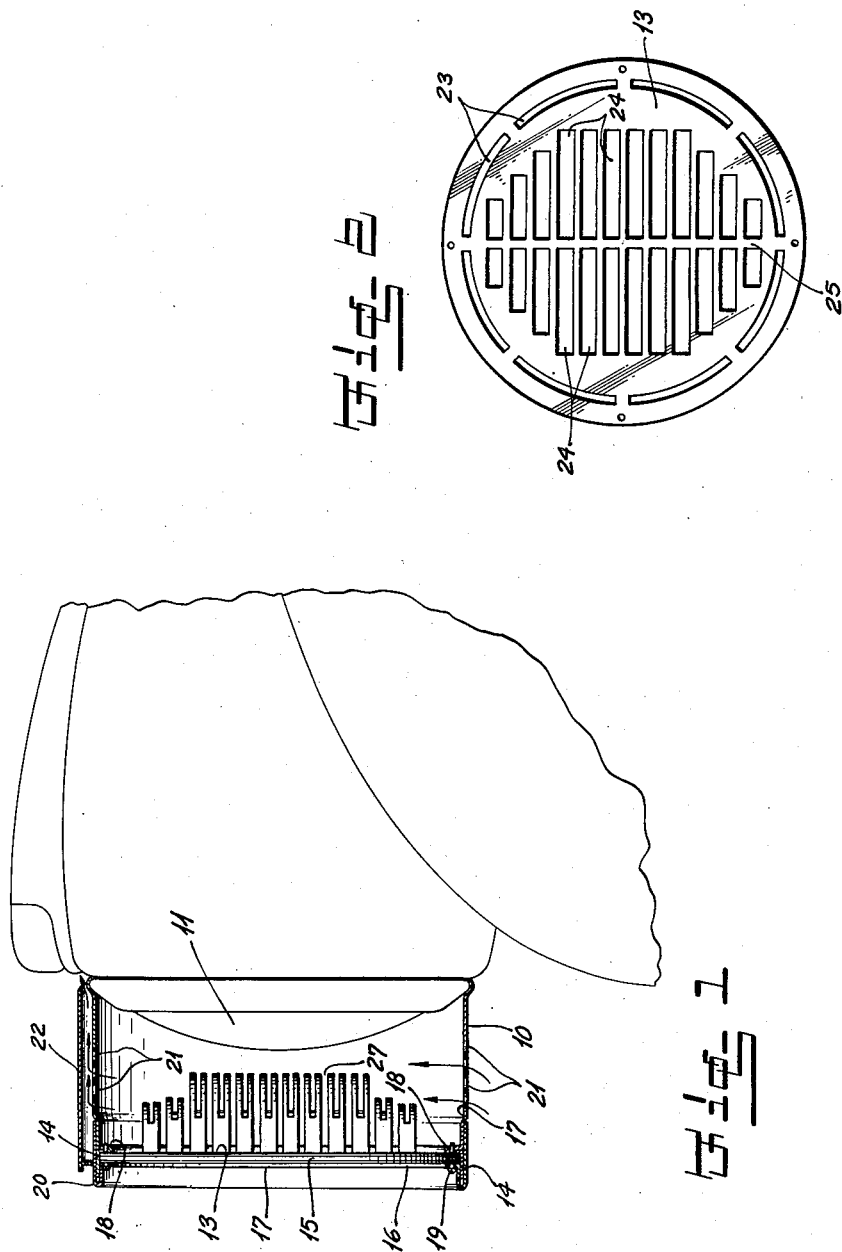
INVENTOR.
WILLIAM C. BAUMAN
BY
Naylor and Lacagnie
ATTORNEYS

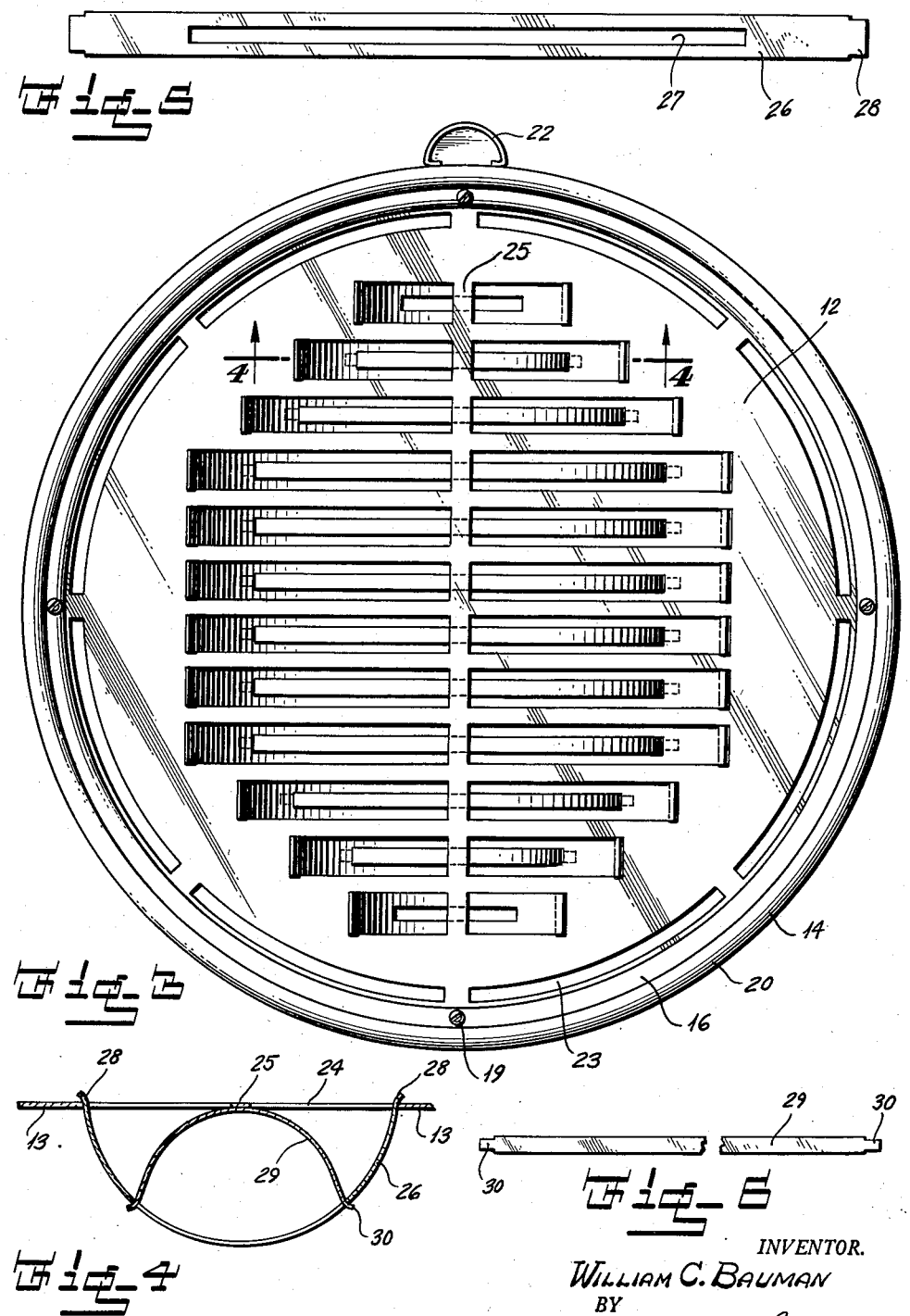

Patented Feb. 5, 1952

2,584,181

UNITED STATES PATENT OFFICE 2,584,181

ANTIGLARE HOUSING FOR HEAD LAMPS

William C. Bauman, Hayward, Calif.

Application August 6, 1949, Serial No. 109,010

4 Claims. (Cl. 240—46.51)

The present invention relates to headlights of the type used on automotive vehicles and more particularly to an anti-glare attachment for use on the headlights in common use at the present time.

The main object of the invention is the provision of a simple and effective device, applicable as an attachment to the front of headlights in common use. without modification thereof, for cutting off and diverting the light rays responsible for the so-called glare so annoying and dangerous for drivers of approaching vehicles.

Another object is to eliminate excessive glare without materially reducing the efficiency of a headlight in its function of lighting the roadway ahead by selectively controlling the emergence of the divergent light beams produced by conventional automobile headlight reflectors, which beams are the main source of so-called glare.

The foregoing objects, as well as other objects and advantages inherent in the embodiment of the invention herein disclosed, are achieved through the provision of a drum shaped attachment adapted to fit in front of a headlight lens, which drum houses a system of translucent baffles and screens so disposed therein as to either cut off or soften the more divergent beams of light coming through the lens while permitting essential lighting of the roadway, as will be more specifically described in connection with the accompanying drawings, where, Figure 1 is a side view in reduced scale of a headlight with the novel attachment in position thereon, the cylindrical casing of the attachment being shown in vertical section to expose structural details;

Figure 2 is a face view of the screen disk forming part of the front closure of the drum and the support for internal baffle strips;

Figure 3 is a front elevation of the attachment in approximately full size;

Figure 4 is a cross section on the line 4—4 of Figure 3 viewed from below;

Figure 5 is a detail view of one of the main baffle strips, and

Figure 6 is a similar view of one of the secondary baffle strips.

In the illustrated embodiment of the invention the attachment comprises a cylindrical housing 10, Figure 1, having one side adapted to be fitted on the rim portion of an automobile headlight lens 11 in any suitable manner, as shown. The outer opening of the housing 10 is closed by an outer plane lens 12 of clear glass and an inner screening disk 13 both of which are carried by an annular frame or band 14. The two are preferably separated by a ring gasket 15. The edge of the lens 12 seats against a clamping strip 16 preferably integral with the frame 14. The frame 14 is formed with a rearward extension having a slide fit with the slightly reduced forward end 17 of the housing 10. The portion 17 of the casing is upturned to form a clamping strip 18 complemental to the strip 16 of frame 14. The lens 12, disk 13 and gasket 15 are securely clamped between these strips by machine screws 19 seated in strip 16 and engaging threaded openings in strip 18. The frame 14 is extended forwardly of lens 12 throughout its circumference, as at 20, so that the lens is counter-sunk within the overhanging edge 20. To provide ventilation for the closed drum shaped housing which exists when the device is combined with a headlight, the upper and under sides are provided with outlet and inlet apertures 21, and to cause circulation of air through the housing by aspiration the apertures in the upper side of the housing open into a U-shaped air conduit or channel 22 extending fore and aft and fixed to the upper surface of the housing. The conduit 22 is open at the rearward end thereof and during travel of the vehicle carrying the glare preventing device the atmospheric air traveling past the open end of the conduit 22 will entrain air issuing from the upper perforations 21 and cause the circulation indicated by the arrows in Figure 1, thus obviating injurious accumulation of heat within the housing.

The screening disk 13, which serves as a base or carrier for a system of screening strips to be described, is composed of a light translucent material such as isinglass, with a lightly frosted finish and is formed with a series of arcuate slots 23 extending circumferentially adjacent its edge and with opposite horizontal slots 24 extending in the diameter of the disk from each side of a central vertical band at 25. The superposed slots 24 extend in series from top to bottom of the disk, the centrally disposed slots being of equal length and terminating on a straight line forming a chord of the disk circle. The upper and lower slots are graduated in length as the periphery of the disk is approached as shown in Figures 2 and 3.

The central, equal length, slots 24 each carry a supplemental screen in the form of baffle strips 26 (Figure 5) of translucent frosted finish material preferably identical with the material of the disk. These strips are formed in the central portion with a longitudinal slot 27 and, as one preferred form of mounting, with tenoned ends 28 designed to fit in the ends of the slots 24 in the disk thus forming mortise and tenon joints when the strips are bent to arcuate form and seated in the ends of slots 24, as best seen in Figure 4, with the bowed portion extending away from disk 13 and towards the lens 11. The slot 27 in each strip 26 is, in turn, screened by a narrower baffle strip 29 of the same material and finish as strips 26 but having no slot. These strips 29 have tenoned ends 30 which are mortised in the ends of slots 27 of strips 26 and bowed forwardly with the central portions in contact with and fixed to the central band 25 of disk 13. Similar strips of shorter graduated lengths are carried by the three terminal upper and lower slots 24 and by the slots 27 in the corresponding strips 26. The terminal upper and lower strips 26 are preferably left without secondary strips 29.

With the construction and arrangement of screening disk and strips above described the beam of light issuing from a headlamp will be modified in such a manner as to materially soften its glaring effect. The arcuate slots 23 in the periphery of disk 13 will permit sufficient direct issue of light to illuminate the sides and immediate front of a roadway. Laterally divergent rays from the core of the light beam will be screened and softened by the lateral segments of disk 13 and the baffle strips 26, 29, to an extent sufficient to eliminate the undesired glare ordinarily directed toward the lanes of opposite travel, but the larger proportion of rays directed obliquely downward in the central vertical zone defined by the area occupied by the slots and baffle strips of disk 13 will emerge from slots 27 to light the roadway ahead. Horizontal rays will, however, be softened by passages through the lightly frosted disk 13 and baffles 26 and 29. Additionally, the housing 10 and extension 20 of the attachment when in position on a lamp form a hood which in itself serves to cut off rays leaving the lamp at an acute angle.

An efficient and economical device for the purpose described is therefore provided by the invention, but it will be evident that specific details of structure herein illustrated and described could be varied without departure from the gist of the invention as claimed.

What is claimed is:

1. A glare controlling device for headlamps comprising a tubular housing adapted to be mounted on a headlamp, a closure for the outer opening of the housing comprising a translucent disk formed with a series of arcuate slots around its periphery and with opposed series of horizontal slots disposed in superposed relation from top to bottom of the disk and divided by a central vertical band in the disk face, primary translucent strips of arcuate form extending from the outer ends of the divided slots inside the housing, said strips being formed centrally with a longitudinal slot, and secondary translucent strips of arcuate form extending from end to end of the slots in the primary strips within the arch thereof and centrally secured to said central vertical band of the disk.

2. A glare controlling device for headlamps comprising a tubular housing adapted to be mounted on a headlamp, a closure for the outer opening of the housing comprising a translucent disk formed with a series of arcuate slots around its periphery and with horizontal slots disposed in superposed relation from top to bottom of the disk, primary translucent strips of arcuate form extending from end to end of the horizontal slots inside the housing, said strips being formed centrally with a longitudinal slot, and secondary translucent strips of arcuate form extending from end to end of the slots in the primary strips within the arch thereof.

3. A glare controlling device for headlamps comprising a tubular housing adapted to be mounted on a headlamp, a closure for the outer opening of the housing comprising a translucent disk formed with horizontal slots disposed in superposed relation from top to bottom of the disk, primary translucent strips of arcuate form extending from end to end of the horizontal slots inside the housing, said strips being formed centrally with a longitudinal slot, and secondary translucent strips of arcuate form extending from end to end of the slots in the primary strips within the arch thereof.

4. In a glare controlling device, the combination with a headlamp and its lens of a cylindrical housing inclosing the lens and extending forwardly therefrom, a closure for the outer end of the housing comprising a translucent disk formed with a series of horizontal slots disposed in superposed relation from top to bottom of the disk, a primary series of longitudinally slotted arcuate strips of translucent material mounted on the disk opposite the slots therein with the arched portions thereof extending towards the lens, and a secondary series of arcuate strips of similar material as the primary strips mounted on said strips opposite the slots therein and within the arches thereof with the central portions of the secondary series of arcuate strips extending forwardly to the disk.

WILLIAM C. BAUMAN.

REFERENCES CITED

The following references are of record in the file of this patent:

UNITED STATES PATENTS

| Number | Name | Date |
|---|---|---|
| 1,250,714 | Thul | Dec. 18, 1917 |
| 1,518,319 | Freeman et al. | Dec. 9, 1924 |
| 2,013,053 | Judah | Sept. 23, 1935 |
| 2,380,691 | Gross | July 31, 1945 |

FOREIGN PATENTS

| Number | Country | Date |
|---|---|---|
| 324,890 | England | Feb. 3, 1930 |